April 12, 1966 L. V. GEWISS 3,245,822

METHOD FOR MANUFACTURING THIN SHEET FILTER MEDIA

Filed June 7, 1963

INVENTOR
LUCIEN VICTOR GEWISS

BY Lane, Aitken & Dunner
ATTORNEYS 3,245,822
METHOD FOR MANUFACTURING THIN
SHEET FILTER MEDIA
Lucien Victor Gewiss, Ville d'Avray, France, assignor to Marc Wood Societe Anonyme pour la Promotion des Exchange Techniques Internationaux, Paris, France, a company of France
Filed June 7, 1962, Ser. No. 200,776
Claims priority, application France, June 12, 1961, 864,644, Patent 1,305,974
7 Claims. (Cl. 117—4)

The dominant preoccupation of manufacturers of sheet filter media intended for the manufacture of formed filter elements is naturally to produce sheets of non-woven fiber having a uniformity of texture and a mechanical resistance susceptible of best satisfying the most diverse needs of the manufacturers of such elements. Heretofore, manufacturers of filter papers have been in a position to satisfy these needs, and more particularly those which relate to so-called "full flow" filtration, only by producing filter papers of a thickness substantially greater than 0.3 mm. In fact, it is only by making the sheet of fibers of a certain thickness that, for an equal mechanical resistance, it seems possible, considering the means of manufacture presently used, to make a filter sheet of great permeability which clogs only after having provided service of substantial duration. Experience shows that for an equal mechanical resistance, thin filter sheets always have a lower and less uniform permeability than thick sheets.

Now it can be imagined that if it were possible to have, particularly for full flow filtration, filter sheets which, while offering good permeability, would be substantially thinner than those presently available, it would be possible, even if these sheets had substantially less mechanical resistance, by applying certain known folding methods which make it possible to form filter elements of small dimensions, to save even more substantially on the volume of the latter and, consequently, to offer the industry filtration units of smaller dimensions and lower price than those which presently exist.

The present invention has as its object a simple process, both easy and economical to apply, which makes it possible to obtain filter sheets which comply with these conditions. It also comprises apparatus for applying this process and, by way of new industrial products, filter sheets obtained by said process.

The process according to the invention essentially comprises subjecting a filter sheet of the usual constitution and thickness to an impregnation treatment by a substance designed to bind the fibers of the said sheet together at the points where they contact each other, concentrating such impregnated substance on the two external faces of the sheet, and dividing this sheet into two parts by a splitting operation effective along its mean cross-section.

In this way two filter sheets are obtained each having a thickness substantially equal to half the thickness of the initial sheet and having certain remarkable properties which will be hereinafter set forth.

In the practical application of the invention, the impregnation of the initial filter sheet can be effected, in a manner already known, by dipping it in the desired solution of an appropriate synthetic resin, for example a resin solution of the urea-formaldehyde in ethyl alcohol type, after which the evaporation of the solvent is insured in such a manner that the evaporation takes place in an equal manner on both faces of the sheet.

During the course of the evaporation, the impregnation substance, which migrates in the direction of the evaporation of the solvent, i.e. from the median cross-section of the sheet toward the two outside faces, disappears almost completely from the former and finds itself, after drying, concentrated at the latter two. In this way, the two outside faces of the sheet find themselves constituted, independently of each other, of fibers solidly anchored to each other by the resin while their mutual central zone consists only of an assembly of unbound fibers held together only by their normal initial intertwining. It is therefore easy to separate progressively the two outside half sheets from each other since by pulling them apart nothing prevents the intermediate fibers from disengaging from each other.

The operation of splitting the sheet can be done by hand though it is desirable to proceed with caution so as to progress very evenly along as straight a line of separation as possible. Mechanically, the splitting operation takes place without difficulty provided the angle of separation selected is the most favorable and does not vary between too broad limits.

It should be noted that the two faces of each of the two split thin sheets obtained by the above-described process are not, of course, identical. One is in fact strongly impregnated while the other is much less so. Also, the first face is relatively smooth while the second is shaggy. When such a sheet is used for making folded filter elements, its shaggy side can advantageously be taken advantage of either to increase the amount of impurities retained before clogging due to the increase in contact surface which results, or else to increase the passage of filter fluid between surfaces downstream from sheets which are in contact with each other.

For the case where it would appear useful to reduce the thickness of the shaggy face, it is easy to remove the excess length of fibers by means of an appropriate grinding process.

The following description with reference to the annexed drawings, given by way of non-restrictive examples, will make it readily understood how the invention can be practiced. In the drawings.

Figure 1:
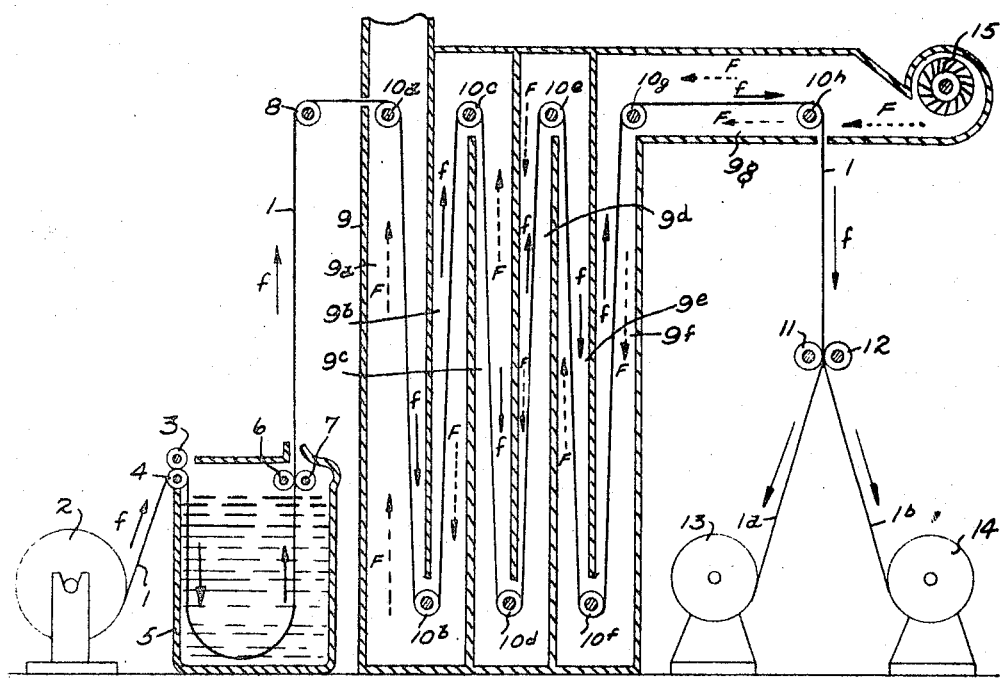
FIG. 1 is a schematic elevation view of one method of executing an installation which makes it possible to perform the impregnation, the drying and the splitting of the initial sheet in a continuous process.

In the example represented in FIG. 1, the installation is more particularly adapted to the splitting of paper filter sheets of a quality suitable for making so-called full flow filter elements.

The sheet of filter paper to be split appears in the form of a continuous sheet 1 which pays out from roll 2 under the traction effect continuously exercised by a pair of cylinders 3 and 4 having suitable driving means (not shown). Downstream from these two cylinders, the continuous sheet 1 plunges into a closed tub 5 within which is located the mixture required for the impregnation, for example a solution of urea-formaldehyde resin in ethyl alcohol which is constantly maintained at the desirable concentration. The continuous sheet 1 comes out of tub 5 under the action of two wringing cylinders 6 and 7 which have the function of extracting from the filter sheet the excess of liquid it contains.

Upon coming out of tub 5, continuous sheet 1 rises vertically up to roller 8 which enables it to change direction and to enter a drying oven 9 made in the form of a zigzag passage of great length consisting of vertical compartments 9a, 9b . . . 9f, and of a horizontal compartment 9g connected to the upper part of the latter vertical compartment 9f. Rollers 10a, 10b . . . 10h suitably arranged insure the guiding of continuous sheet 1 and enable it to move vertically in the various compartments, alternately from top to bottom and from bottom to top, then horizontally in compartment 9g.

Continuous sheet 1 comes vertically out of the drying oven downstream from roller 10h where it passes between two cylinders 11 and 12 which serve both to guide and to split the sheet. It is when it comes out from between these two cylinders that the splitting of continuous sheet 1 takes place into two thin sheets 1a and 1b. This splitting is initially started by hand, after which it proceeds mechanically, the two sheets 1a and 1b being reeled onto two rolls 13 and 14 driven in rotation by appropriate motors (not represented). Naturally, the usual appropriate means (likewise not represented) are provided for automatically regulating the speed of these motors as a function of the reel diameter of sheets 1a and 1b so as to maintain the peripheral linear velocity of rolls 13 and 14 constant in order that the two sheets 1a and 1b resulting from the splitting will be subjected to a constant traction force.

The ventilation necessary for drying the continuous sheet of paper 1 which moves continuously in drying oven 9 in the direction of arrows f is insured by an assembly designed not only to move the masses of air used for this purpose in the direction of arrows F, but also to maintain these masses at the highest acceptable temperature which does not result in a premature polymerization of the impregnation substance used (this polymerization being best deferred until after the filter elements are manufactured). This assembly, which is moreover designed to insure the recovery of the solvent vapors (which, by reason of their toxicity and their commercial value cannot be discharged into the atmosphere) has not been represented in detail since it relates to a known technique; only blower 15 which is a part of such an assembly has been represented, for the purposes of the schematic drawing, at one end of horizontal compartment 9g.

Figure 2:
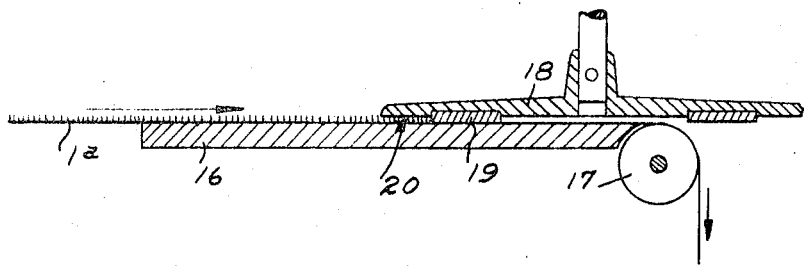
FIG. 2 is a schematic cross-section of a device which can be used to reduce or to even out the height of the shaggy fibers on the split face of each of the thin sheets obtained.

As indicated above, the length of the shaggy fibers on the split face of each of the thin sheets obtained can be reduced or evened out by a grinding process. FIG. 2 represents schematically a device designed to be used for this purpose. It comprises a table 16 above which the sheet of thin paper, 1a for example, is caused to move continuously, shaggy side up. A roller 17 is provided at one end of table 16 in order to cause sheet 1a to change direction sharply and to hold it taut on the table. Parallel to the latter and above it is located a grinding wheel 18 whose abrasive surface 19 protrudes slightly beyond its lower steel face 20. The latter is in contact with the still shaggy face of sheet 1a in order to keep the sheet pressed against table 16 over its entire length. The adjustment of the space between the table and abrasive surface 19 of the grinding wheel can be effected by conventional means, the motor which drives the grinding wheel being mounted on a carriage susceptible of being moved vertically on slides by means of a micrometric screw, for example.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for making a plurality of sheets of fibrous material from a single ply sheet of said material comprising thoroughly impregnating said sheet with a solution of resinous binder material contained in an evaporatable carrier; evaporating said carrier from both faces of said sheet so as to cause said binder material to migrate to and concentrate at points adjacent said faces of said sheet; and separating said sheet into a plurality of sheets along a plane substantially parallel to and between said faces and which passes through a portion of said sheet having a lesser concentration of binder material than adjacent said faces.

2. A process as defined in claim 1 wherein said binder material is chemically unreactive with said fibrous material.

3. A process as defined in claim 1 wherein said binder material is a urea-formaldehyde resin and said carrier is ethyl alcohol.

4. A process as defined in claim 1 wherein said binder is a polymerizable material, said binder being in an incomplete state of polymerization at the time said separation step is carried out.

5. A process as defined in claim 1 wherein said plane is medially positioned between said two faces of said sheet and is substantially parallel thereto.

6. A process as defined in claim 1 wherein said evaporation takes place through the application of substantially equal quantities of heat to each face of said sheet.

7. A process for making a plurality of sheets of fibrous material from a single ply sheet of said material comprising thoroughly impregnating said sheet with a solution of synthetic resin binder material contained in an evaporatable carrier; evaporating said carrier from both faces of said sheet so as to cause said binder material to migrate to and concentrate at points adjacent said faces of said sheet; and separating said sheet into a plurality of sheets along a plane substantially parallel to and between said faces and which passes through a portion of said sheet having a lesser concentration of binder material than adjacent said faces.

References Cited by the Examiner

UNITED STATES PATENTS

| | | | |
|---|---|---|---|
| 1,459,499 | 6/1923 | Brown et al. | 156—254 |
| 1,465,541 | 8/1923 | Brown et al. | 156—254 |
| 2,058,502 | 10/1936 | Quinn | 51—72 |
| 2,092,967 | 9/1937 | Gay et al. | 117—4 |
| 2,195,239 | 3/1940 | Champsaur | 156—254 |
| 2,368,024 | 1/1945 | Himmell | 117—4 |
| 2,587,171 | 2/1952 | Knewstuff et al. | 154—254 |
| 2,644,780 | 7/1953 | Simkins et al. | 156—254 |
| 2,676,128 | 4/1954 | Piccard | 156—46 |
| 2,709,146 | 5/1955 | Berry | 156—254 |
| 2,762,170 | 9/1956 | Hunziker | 51—72 |
| 2,765,247 | 10/1956 | Graham | 154—46 |

EARL M. BERGERT, *Primary Examiner.*

DOUGLAS J. DRUMMOND, *Examiner.*